United States Patent
Visalli et al.

(10) Patent No.: US 7,283,460 B1
(45) Date of Patent: Oct. 16, 2007

(54) BUS SWITCH ENCODING FOR REDUCING CROSSTALK EFFECTS IN BUSES

(75) Inventors: Giuseppe Visalli, Messina (IT); Francesco Pappalardo, Paternò (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 11/397,924

(22) Filed: Apr. 3, 2006

(51) Int. Cl.
*H04J 1/12* (2006.01)
*H03H 7/30* (2006.01)

(52) U.S. Cl. .................. 370/201; 370/286; 375/229

(58) Field of Classification Search .......... 341/50, 341/94, 175; 370/201, 286; 375/229
See application file for complete search history.

(56) References Cited

U.S. PATENT DOCUMENTS

| | | | |
|---|---|---|---|
| 5,966,407 A * | 10/1999 | Hiraki et al. | 375/257 |
| 5,982,741 A * | 11/1999 | Ethier | 370/201 |
| 6,438,195 B1 * | 8/2002 | Hsieh | 378/4 |
| 6,665,308 B1 * | 12/2003 | Rakib et al. | 370/441 |
| 6,933,863 B2 | 8/2005 | Visalli et al. | |
| 7,012,925 B2 * | 3/2006 | Benayoun et al. | 370/396 |
| 7,013,253 B1 * | 3/2006 | Cong et al. | 703/14 |
| 7,095,707 B2 * | 8/2006 | Rakib et al. | 370/204 |
| 2004/0047283 A1 * | 3/2004 | Bonwick et al. | 370/201 |
| 2005/0163207 A1 * | 7/2005 | Buckwalter et al. | 375/229 |
| 2006/0045527 A1 * | 3/2006 | Maeda et al. | 398/79 |
| 2007/0036207 A1 * | 2/2007 | Wang | 375/222 |

OTHER PUBLICATIONS

Kim, K. et al., "Coupling-Driven Signal Encoding Scheme for Low-Power Interface Design," ACM/IEEE International Conference on CAD: 318-321, Nov. 2000.
Olivieri, M. et al., "Bus-Switch Coding for Reducing Power Dissipation in Off-Chip Buses," IEEE Transaction on Very Large Scale Integration Systems 12[12]: 1374-1377, Dec. 2004.

* cited by examiner

*Primary Examiner*—Linh Nguyen
(74) *Attorney, Agent, or Firm*—Lisa K. Jorgenson; Robert Iannucci; Seed IP Law Group PLLC

(57) ABSTRACT

Data are transmitted over a bus including a plurality of lines, wherein energy is dissipated as a result of data transmission. Preferably, the data to be transmitted in parallel are partitioned in a plurality of clusters of data bits. Each cluster is subject to re-ordering according to a set of reordering patterns to produce a corresponding set of respective candidate clusters of data bits. Crosstalk activity values related to transmitting the various candidate clusters are calculated and compared to identify an optimum cluster of data bits that minimizes the energy dissipated as a result of transmission by jointly minimizing the switching activity and the crosstalk activity. The optimum cluster of data bits so identified is then used for transmission over the bus. The optimum cluster of data bits thus causes those bits that give rise to high crosstalk activity to be allotted to bus lines having lower crosstalk capacitance values.

36 Claims, 10 Drawing Sheets

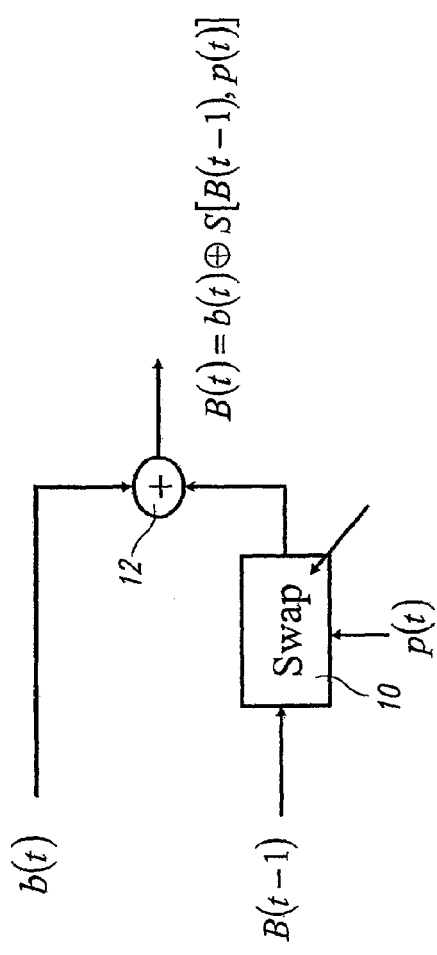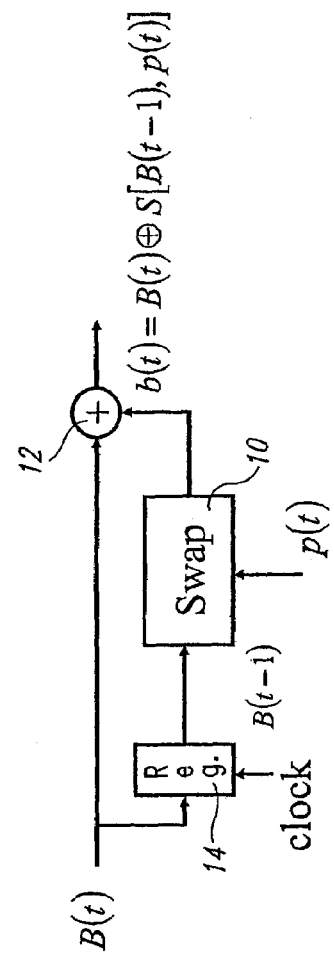

BUS SWITCH ENCODING FOR REDUCING CROSSTALK EFFECTS IN BUSES

BACKGROUND OF THE INVENTION

1. Field of the Invention

The invention relates to bus switching techniques. Specifically, the invention relates to certain improvements over the solution disclosed in U.S. Pat. No. 6,933,863, the entire disclosure of which is incorporated herein by reference.

2. Description of the Related Art

The scenario of new sub-micrometric technologies (DSM) allows integration of increasingly more complex devices in increasingly smaller silicon wafers, while also effectively controlling power consumption and speed performance of the related systems. Current forecasts indicate the possibility of integrating increasingly more complex systems, while being able to control power consumption at both the technological and system levels. However, while future systems are expected to have very small dissipation levels, energy consumption by interconnection units is not expected to follow that trend. This applies particularly to off-chip electrical buses, with the ensuing dissipation level of the units that drive the associated pads and the power consumption process related to the process of charging and discharging the parasitic capacitances associated therewith.

In fact, a generic node i, fed with a voltage Vdd and having associated a parasitic capacitance Ci, dissipates at an operating frequency f a dynamic power Pi given by:

$$P_i = \frac{1}{2} \cdot C_i \cdot V_{dd}^2 \cdot f \cdot \alpha \qquad (1)$$

where $\alpha$ (alpha) is the so-called switching activity, namely the percentage of 1→0 and 0→1 transitions that occur in a time unit. It will be appreciated that the dependency on the voltage Vdd follows a quadratic law, while the dependency on the other parameters is linear.

Prior art techniques for reducing the dissipated power Pi typically rely on reducing the voltage Vdd (which may turn out not be feasible due to the need of ensuring signal integrity against disturbances), lowering of the operating frequency f (which inevitably impacts on performance), or signal encoding to reduce inasmuch as possible the parameter $\alpha$. In fact, bus-encoding techniques act on switching activity, namely the parameter $\alpha$, without affecting system performance or its capacitance to reject disturbances affecting the useful signal.

Bus encoding is convenient if the additional consumption related to the presence of the encoding/decoding systems is lower than the energy savings achieved on the bus. In general terms, encoding an address bus is simpler than encoding a data bus.

This is because of the spatial and temporal (time) locality principle that governs the generation of addresses in a CPU.

Simply stated:

temporal or time locality means that, if a CPU uses a certain resource at a time t, then a substantial likelihood exists that it will be using that resource at a slightly later time;

spatial locality means that a CPU uses a certain location at a time t, then a substantial likelihood exists that at a slightly later time that CPU will be using a location nearby.

These considerations are exploited, e.g., in "cache" memories, which strongly reduce the times of access to an external memory by storing the locations that are used more frequently.

Bus encoding techniques tend to become less effective as the bus size, and consequently the transmission rate increase. To counter this, one of the simplest bus encoding techniques is the so-called "bus-invert" technique. This is based on the concept of estimating the switching activity associated with the transmission of a given set of data over the bus and complementing (i.e., chenging 1→0 and 0→1) the set of data transmitted if the estimated switching activity exceeds 50%.

In particular, in the presence of identical line capacitances, the parameter $\alpha$ (alpha) is measured by counting the number of logical "1s" in the transition between B(t−1) and B(t), that is in the transition between two subsequent states of the bus output.

In mathematical terms, if the bus has N lines ("wires"):

$$B(t) = \begin{cases} b(t) & H[b(t) \oplus B(t-1)] < N/2 \\ \overline{b}(t) & H[b(t) \oplus B(t-1)] \geq N/2 \end{cases} \qquad (2)$$

where b(t) represents the bus input at time t (i.e., the string of bits to be transmitted in parallel over the bus at time t) and $\oplus$ denotes the Exclusive-OR (X-OR) logical operator The parameter $\alpha$ (alpha) is computed by using the Hamming operator (H), that is by counting the number of "1s" in the Exclusive-OR above.

Such an approach is no longer accurate if the capacitances in the bus are not identical. In that case, the dynamic switching power P, that is the power related to loading/unloading the bus self capacitances, becomes (for a bus of N identical lines):

$$P = \sum_{i=1}^{N} \frac{1}{2} \cdot C_i \cdot f \cdot V_{dd}^2 \cdot \alpha_i \qquad (3)$$

That formula includes constant factors (namely f, Vdd, ½=0,5). The parameter $\alpha_i$ can be expressed as:

$$\alpha_i = \lim_{T \to \infty} \frac{n_i(T)}{T} \qquad (4)$$

where N is the number of the lines in the bus, T is the time between two subsequent states in the bus (i.e., the time between two subsequent transmissions of data on the bus and $n_i(T)$ represents the total transitions (0→1 and 1→0) measured in the time interval [0,T] corresponding to the i-th bus line.

By purging the effects of the constants f, Vdd, N and 0.5, the "normalized" power therefore becomes, in the case of switching only (self capacitance activity):

$$p = \sum_{i=1}^{N} C_i^s \cdot n_i \qquad (5)$$

The quantity $C^S$ (S=self capacitance) takes into account (notionally for each bus line, thus the suffix i) the bus asymmetry, while the $n_i$'s can assume values equal to 0 or 1. The formula thus provides a value proportional to the energy dissipated for each cycle T.

As indicated, Bus Invert techniques are known in the art: see, e.g., K. W. Kim, K. Baek, N. Shanbag, C. L. Liu and S. Kang "Coupling Driven Signal Encoding Scheme For Low-Power Interface Design" in ACM/IEEE International Conference on CAD. November 2000, where a so-called Coupled Bus Invert (CBI) technique is known. Bus switching techniques, essentially aiming at reducing switching activity in large electrical buses are disclosed, e.g., in:

M. Olivieri, F. Pappalardo and G. Visalli "Bus-Switch Coding, For Reducing Power Dissipation In Off-Chip Buses" in IEEE Transaction on Very Large Scale integration Systems Volume 12 No. 12 Dec. 2004; or U.S. Pat. No. 6,933,863 issued to G. Visalli and F. Pappalardo.

Specifically, U.S. Pat. No. 6,933,863 discloses a procedure that, from the logical point of view, is an iterative procedure. A large size bus is partitioned into a plurality of smaller identical clusters, so that the string of bits to be transmitted over the bus is similarly partitioned into a corresponding plurality of clusters of bits. Each cluster is re-ordered by resorting to an exchange sequence (reordering pattern) that admits only one inverse pattern for the recovering upon reception the data transmitted. Each cluster as re-ordered is subjected to a further encoding function, which leads to a further increase in performance. The encoder performs trials, evaluating that function by considering all the possible re-ordering patterns, and selecting the one that implies the minimum electrical activity (metric of the encoder) of the whole bus. The number of iterations is a function of the cluster depth based on a factorial law: a cluster of 4-lines admits 4!=24 possible sequences of re-ordering.

Crosstalk is another source of energy dissipation, which prevails in on-chip buses. In short, simultaneous switching on two adjacent bus lines connected by a parasitic capacitance leads to a disturbance overvoltage applied on a "victim" line plus power dissipated due to the change of polarity on the line.

FIG. 1 is a schematic representation of three adjacent bus lines including a "victim" line K, having two adjacent lines K−1 and K+1 likely to act as "attacker" lines with associated disturbance generators G1 and G2. $C_S$ and $C_L$ are representative of the "line" (self) and "crosstalk" capacitances, respectively. In order to properly take into account crosstalk, one must be able to evaluate the effects thereof with regard to the various possible logical states of both attacker and victim lines.

In fact Kim et al., cited previously, have already suggested a variation of the bus-invert technique somewhat intended to take into account crosstalk. That approach is essentially a coupling driver bus-invert (CBI) technique based on the hypothesis/assumption that the capacitances $C_S$ and $C_L$ are equal. This is inevitably a strong limitation and the effectiveness of the technique is thus limited to those situations that come sufficiently close to that assumption.

BRIEF SUMMARY OF THE INVENTION

One embodiment of the invention reduces the dynamic energy/power dissipated by a large electrical (data) bus.

Various embodiments of the invention achieve that result within the framework of both off-chip and on-chip buses. In the former case, the main source of dissipation of dynamic energy is the loading/unloading of electrical charge in the parasitic capacitances between the bus lines and ground. In the latter case, the need exists of taking into account dissipation/consumption related to the simultaneous transitions (i.e., switching) on adjacent bus lines, which is related to other parasitic capacitances (typically, inter-line or inter-wire capacitances).

One embodiment of the invention improves the solution disclosed in U.S. Pat. No. 6,933,863.

A preferred embodiment of the inventions is thus a method of transmitting data over a bus including a plurality of lines, wherein energy is dissipated as a result of data transmission. Preferably, the lines (wires) in the bus are partitioned into a plurality of line clusters. The string of data to be transmitted at a time (i.e., in parallel) over the bus is thus correspondingly partitioned in a plurality of clusters of data bits each to be transmitted at a time over a respective line cluster. Each cluster of data bits is subject to re-ordering according to a set of reordering patterns to produce a corresponding set of respective candidate clusters of data bits to be transmitted at a time over the respective line cluster. The crosstalk activity (and, preferably, also the switching activity) values related to transmitting the various candidate clusters of data bits over the line cluster in question is then calculated. Comparing the values thus obtained leads to identifying, as a function of the crosstalk (and switching) activity values calculated, an optimum cluster of data bits (i.e., an optimum re-ordering pattern) that minimizes the energy dissipated as a result of transmission over the respective line cluster. The optimum cluster of data bits so identified is then used for transmission over the bus, possibly by applying an identical re-ordering pattern to all line clusters. In the currently preferred best mode of carrying out the invention, such an optimum cluster of data bits/reordering pattern is selected as the one that jointly minimizes the switching activity and the crosstalk activity. The bus lines may be arranged to have non-uniform line placement, so that these lines have different crosstalk capacitance values with respect to their neighboring lines, these different crosstalk capacitance values ranging between lower and higher values. The optimum string (cluster) of data bits thus causes those bits that give rise to high crosstalk activity to be allotted to bus lines having lower crosstalk capacitance values.

The invention involves a method and a corresponding system, as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The arrangement described herein provides a bus switch mechanism that reduces the dissipation of dynamic power. This arrangement is effective both in the case of off-chip buses, where self-capacitance dominates coupling effects, and in the case of on-chip buses where crosstalk activity (i.e., adjacent lines toggling simultaneously) becomes particularly significant and dominates energy dissipation and noise level. The arrangement described herein provides a novel application of a reordering-based approach, in order to reduce crosstalk power and interferences. The arrangement described herein relies on a combined encoding strategy and bus-to-wire placement for reducing both crosstalk activity and noise in high data-transfer on-chip buses. This approach is dictated by a bus switch model based on a metrics that takes into account crosstalk coupling effects related to wire placement. The results obtained indicate that this approach greatly facilitates data transfer in on-chip buses conforming with state-of-the-art sub-micron technologies.

BRIEF DESCRIPTION OF THE SEVERAL VIEWS OF THE DRAWINGS

The invention will now be described, by way of example only, with reference to the attached representations, wherein:

FIGS. 9 to 13 are further block diagrams exemplary of circuitry adapted for use within the framework of the arrangement described herein.

DETAILED DESCRIPTION OF THE INVENTION

In the following description, numerous specific details are given to provide a thorough understanding of embodiments of the invention. One skilled in the relevant art will recognize, however, that the invention can be practiced without one or more the specific details or with other methods, components, materials and so on. In other instances, well-known structures, materials, or operations are not shown or described in detail to avoid obscuring aspects of the invention. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessary or referring to the same embodiment. Furthermore, the particular features, structures, or characteristic may be combined in any suitable manner in one or more embodiments.

Essentially, the arrangement described herein is based on the arrangement disclosed in U.S. Pat. No. 6,933,863. In fact, a sub-optimal implementation of the "cluster-based" bus switch concept introduced therein leads to a reduction in the number of the re-ordering sequences based on profiling of the applications, with the aim of defining a subset of the complete set re-ordering sequences that still ensures satisfactory performance.

Figure 2:
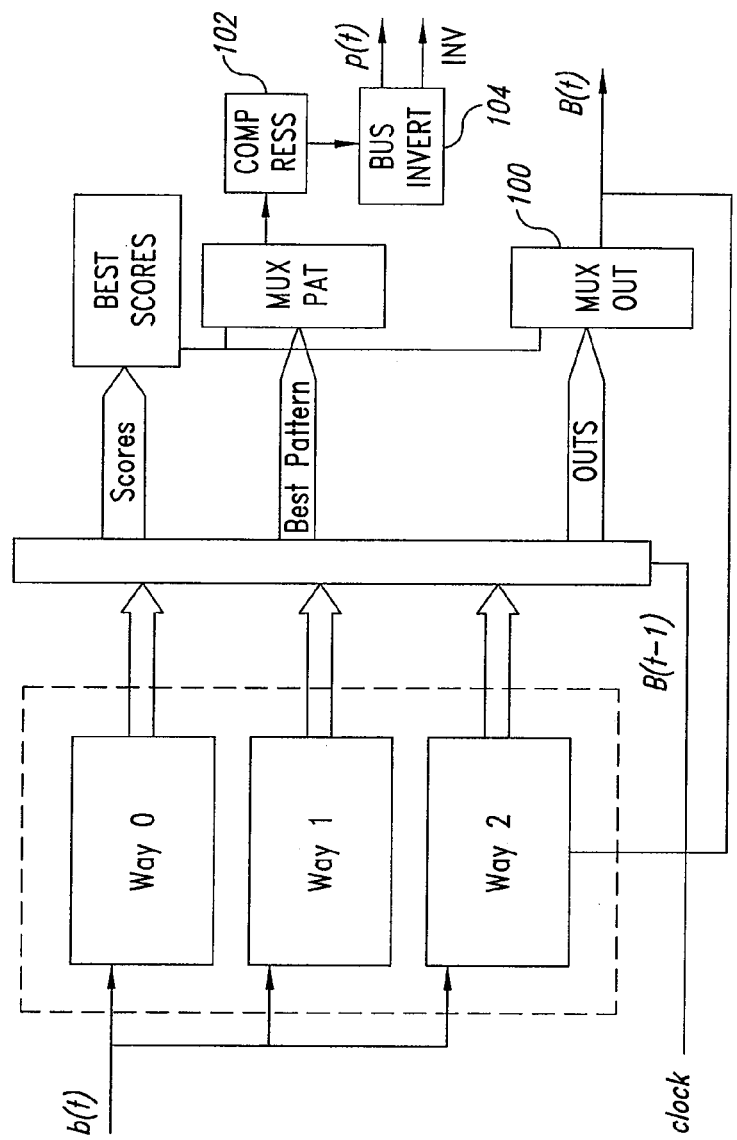
FIG. 2 is a notional block diagram of an encoder for use within the framework of the arrangement described herein.

The block diagram of FIG. 2 is representative of the possibility of subjecting b(t)—that is, the bus input—to a set of different re-ordering sequences designated Way 0, Way 1, Way 2, and so on. The results are evaluated in terms of the switching activity possibly associated to each re-ordering sequence to provide a list of best scores. The re-ordering sequence is thus selected as the one providing the best score and used to define a corresponding re-ordering pattern MUX PAT to drive an output multiplexer 100 to produce the actual cluster of bits B(t) to be transmitted on the bus.

In fact, each individual way receives the bit string b(t) to be transmitted over the bus and subjects it to a series of encoding attempts over a subset of re-ordering patterns. For instance, in a BS3X encoder (see below) 3!=6 possible reordering patterns are considered. Each way out of the three shown in FIG. 2 will therefore attempt encoding using two out of six patterns, thus increasing operating speed and reducing encoder complexity.

The best pattern (from MUX PAT) will be compressed from 3*log 2(3)=6 to log 2(3!)=3 bits (using BS3X) and further transmitted after encoding (essentially as disclosed in U.S. Pat. No. 6,933,863).

The pattern MUX PAT is also used in a compression stage 102 to generate in bus invert block 104 the logical signal INV indicating that the data have been possibly complemented as well as a signal p(t) indicative of the current re-ordering pattern. The actual data transmitted B(t) is also fed back as B(t−1) towards the re-ordering stages Way 0, Way 1, Way 2, . . . .

The general bus switching (BS) architecture schematically shown in FIG. 2 lends itself to fully iterative implementations as well as to more efficient architectures exploiting parallelism, where a respective unit for evaluating the switching metric (activity) for each possible reordering pattern.

Complex BS architectures are fully justified for most off-chip applications, where energy savings are more substantial. In any case, appreciable improvements can be achieved also with simpler architectures, e.g., with a cluster depth equal to three (which corresponds to six possible re-ordering patterns) and an encoding function that is simpler while preserving a good performance level.

An example of such an encoding function is:

$$B(t)=b(t)\oplus S[B(t-1),p(t)] \quad (8)$$

where the symbols B(t) and b(t) again represent the bus output and input, t denotes time and p(t) is the current reordering pattern. Again $\oplus$ denotes the Exclusive-OR (X-OR) logical operator and S is the "swap" operator discussed in the following.

The relationship (8) obviously admits only one correct reverse decoding function, namely:

$$b(t)=B(t)\oplus S[B(t-1),p(t)] \quad (9)$$

In both relationships (8) and (9) S represents the swap operator, namely the process of partitioning (segmenting) the bus into line clusters for application in each cluster of the common pattern p(t). This common re-ordering pattern is transmitted as described in U.S. Pat. No. 6,933,863, namely through a small additional bus.

In on-chip applications corresponding to the disclosure of U.S. Pat. No. 6,933,863 a "light" architecture based on cluster depth equal to three (briefly Bus Switch 3× or BS3X) and implementing the encoding function (8) above is particularly convenient. Such an implementation uses a metrics as defined in the relationships (6) and (7) below. This may be typically in the form of an iterative arrangement as shown in FIG. 3.

Figure 3:
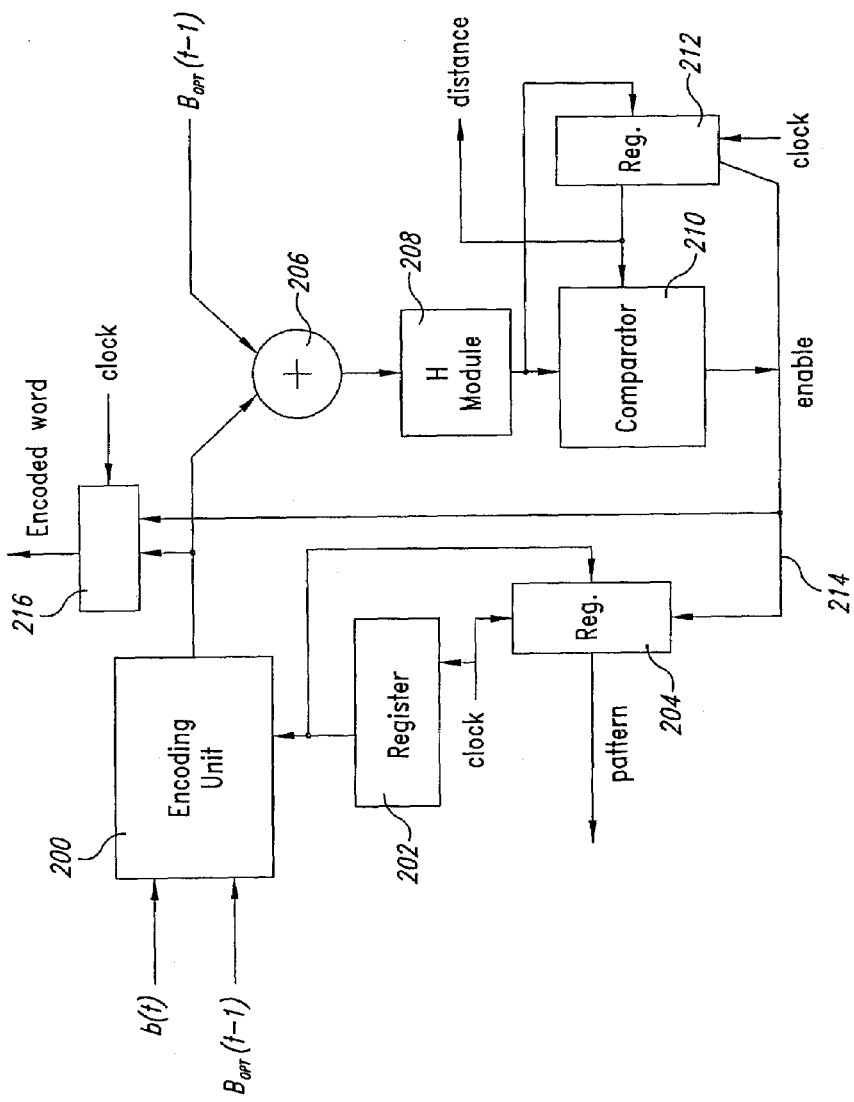
FIG. 3 is a block diagram of a circuit for use within the framework of the arrangement described herein.

In the block diagram of FIG. 3, reference numeral 200 denotes as a whole a module that implements the relationship (8) having b(t), B(t−1)—here noted $B_{OPT}(t)$ as it was previously obtained by using an "optimum" re-ordering pattern—and p(t) as its inputs.

The module 200 could be notionally comprised of a so-called "twin-swap" unit as known in the art. However, such an arrangement does not represent a preferred choice for on-chip buses due to its inherent complexity.

For that reason, the encoding function expressed by formula (8)) is preferably implemented as per the block diagram of FIG. 9, where the "swap" module 10 corresponds to the block bearing the same number in U.S. Pat. No. 6,933,863 and reference numeral 12 denotes an EX-OR module.

Similarly, the decoding function expressed by formula (9) can be advantageously implemented as per the block diagram of FIG. 10: there again the "swap" module 10 corresponds to the block bearing the same number in U.S. Pat. No. 6,933,863 and reference numeral 12 denotes an EX-OR module. The block 14 represents a clocked register where the "previous" bit string transmitted on the bus, namely B(t−1) is stored to be X-ORed with B(t) at module 12.

The re-ordering patterns p(t) are generated in a pattern generator comprised of a state machine.

The output of the module 200 is fed to a module 206 to be X-ORed with $B_{OPT}(t)$. The resulting signal node is fed to a module (H module) 208—with a new architecture with respect to block 70 in U.S. Pat. No. 6,933,863—that computes all the possible bus transitions and transfers all the possible results to a comparator module 210. There, the results obtained for the various candidate re-ordering patterns are compared so that the "optimum" pattern is identified, giving rise to the minimum distance on he basis of the metrics selected. The reference numerals 204, 212, and 216 denote registers that, in the case of a temporary minimum value for the "score" calculated in the block 210—i.e., the minimum value calculated up to a certain point of time (as identified by an "enable" signal on a line 214 being set equal to 1) store:

the current pattern (i.e., p(t)—register 204), the current output (i.e., B(t)—register 216), and the current "score" (i.e., the value for the dynamic energy—register 212).

The enable signal is thus distributed to the re-ordering pattern generator 204, the module 212 and to the output register ir stage 216 to produce transmission the encoded word B(t) on the bus. The re-ordering pattern p(t) is transmitted by using a parallel extra bus.

Figure 1:
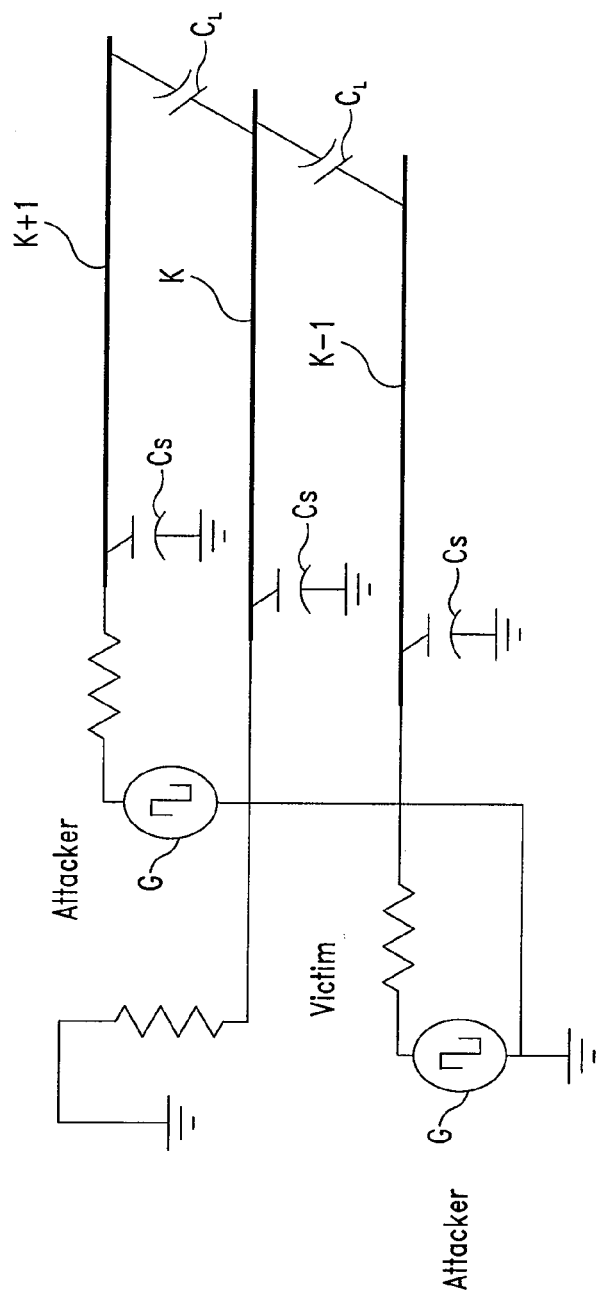
FIG. 1 has been already discussed in the foregoing.

Table 1 below represents the normalized energy that takes into account both switching and crosstalk activity as a function of a parameter λ (lambda), namely the ratio of the crosstalk capacitance ($C_L$) to the line capacitance ($C_S$), namely $\lambda = C_L/C_S$ (see the general representation of FIG. 1).

TABLE 1

|       | 0->0  | 0->1        | 1->0          | 1->1 |
|-------|-------|-------------|---------------|------|
| 0->0  | 0     | 1 + λ       | 0             | 0    |
| 0->1  | 1 + λ | 2           | 1 + 2 · λ     | 1    |
| 1->0  | 0     | 1 + 2 · λ   | 0             | λ    |
| 1->1  | 0     | 0           | λ             | 0    |

In Table 1 the various possible switching events of a "victim" wire are represented by the upper line, while the leftmost column represents the possible switching events of an "attacker" wire. Obviously, Table 1 is symmetrical in that the "victim" and the "attacker" can exchange their roles. Specifically:

$$e_{TOT} = \sum_{i=1}^{N} (\alpha_L^i \cdot C_L^i + \alpha_s^i \cdot C_s^i) \quad (6)$$

$$\lambda_i = \frac{C_L^i}{C_s^i} \quad (7)$$

Essentially, the "normalized" energy is obtained by removing the frequency component and Vdd from the relationship (8), which essentially expresses a power. Table 1 expresses the "total" normalized energy, partly as a single digit (0,1) and partly as the sum of (0,1) plus a term including lambda). The term (0,1) is representative of the (self) switching energy, while the term with lambda with is representative of the crosstalk energy. In the formula (6) the terms $\alpha_s$ (alpha$_s$) may be (0,1) according to Table 1, while the terms $\alpha_L$ (alpha$_L$) may be (0,1,2) according with the Table.

If one takes two adjacent bus lines where the transitions are 1→0 and 0→1, by looking at the table the term for self switching is 1 (alpha$_s$) while the crosstalk is 2 (alpha$_1$_l). The formula (6) can be rearranged as:

$$e_{TOT} = \sum_{i=1}^{N} C_s^i \cdot (\alpha_L^i \cdot \lambda_i + \alpha_s^i) \quad (8)$$

while, in the frequent case where all self capacitances are identical, one obtains;

$$e_{TOT} = \sum_{i=1}^{N} (\alpha_L^i \cdot \lambda_i + \alpha_s^i) \quad (9)$$

that essentially corresponds to Table 1.

In order to be able to take into account the effects of crosstalk the single block 208 shown in FIG. 3 that calculates all the bus transitions is replaced by a more complex unit, capable of expressing the relationships (6) and (7) above. Preferably, these are computed by using a fixed-point notation.

In computers, real numbers are represented mostly as fixed point or floating point. Floating point notation conforms with the IEEE-754 standard with a minimum representation on 32-bits (single precision). Many applications exist where floating point is implemented with non-standard precision to reduce the computational load. The basic units for floating-point calculations are complex: in fact implementing both an adder and a multiplier require a high number of logical gates. Fixed point notation is a simpler, more economical representation and, in some instances, more precise than floating point for the same number of bits.

No standards exist for fixed point notation and the related circuits (primarily an adder) turn out to be largely more economical than the corresponding IEEE-754 floating point circuits. A N bit string is partitioned in two fields: the field for the integer number NI and the field for the fractional part ND (which typically is expressed as a power of two with a negative exponent). If the algorithm performed with a fixed point notation involves numbers (i.e., variables) that are more or less of the same order of magnitude, certain applications (e.g., filtering) will accept that any real variable is "scaled" by a constant value. While not all algorithms that make use of real numbers admit the possibility of scaling their own inner variables, this process can be applied to the arrangement described herein with the aim of reducing the field NI, with the ensuing possibility of having a wider field ND and increasing the accuracy of the algorithm.

In the presently preferred embodiment of the invention, the relationships (6) and (7) above are computed by using a fixed-point notation scaled in order to minimize the number of bits devoted to representing the integer portion thus providing a more accurate representation of the non-integer portion.

The arrangement described herein thus improves the basic arrangement of U.S. Pat. No. 6,933,863 in that the effects of crosstalk are taken into account without imposing any limitations on $C_S$ and $C_L$ (see FIG. 1).

It will be appreciated that the encoding/decoding function(s) represented in (8) and (9) are merely exemplary in that the arrangement described can operate with—any—function adapted to derive B(t) from b(t). Again, for on-chip applications, a cluster depth equal to three (i.e., BS3X) represents a preferred choice.

Figure 4:
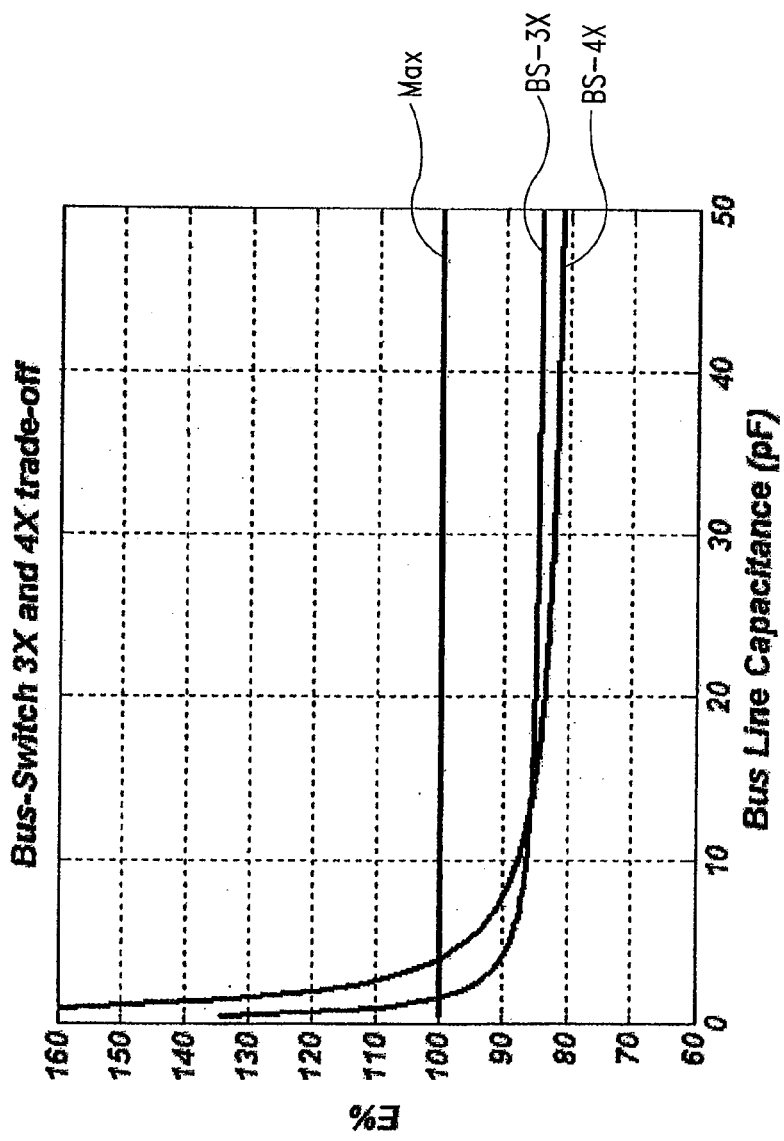
FIG. 4 is a diagram providing a performance comparison of different encoding schemes within the framework of the arrangement described herein.

The comparative diagrams of FIG. 4 show experimental data obtained for encoding function such as (8) for cluster depths equal to three (BS-3X) and four (BS-4X), respectively. Specifically, FIG. 4, illustrates (ordinate scale) portrays the behaviors versus the bus line capacitance $C_S$ (in pF) of the parameter E % introduced in the IEEE article by M. Olivieri et al., cited previously. In brief, the total balance of average energy saving per bus cycle can be expressed as $$E_{saved} = 0.5 \text{switching\_reduction} T\, C_{bus}\, V_{dd}^2 - \text{energy\_overhead}$$

where T represents the toggling activity before the introduction of bus encoding; the total energy saving percentage is expressed by the ratio $$E\% = (0.5T\, C_{bus} V_{dd}^2 - E_{saved})/(0.5T\, C_{bus} V_{dd}^2) 100\%$$

A value of E % lower than 100% means that Bus Switching is effective in reducing the total energy consumed per bus cycle, while E % greater than 100% means that the bus capacitance is so small that the energy overhead of the encoder dominates and the BS technique is inappropriate.

Essentially, in addition to being simpler to implement, BS3X provides better performance for low values of $C_S$ (i.e., up to about 13-14 pF). For higher values of $C_S$, resorting to a BS4X structure might offer some marginal advantages, which hardly reward the more complex structure of BS4X. This confirms that a cluster depth equal to three (i.e., BS3X) represents a preferred choice as it provides performance while at the same time reasonably limiting requirements in terms of circuit resources.

The arrangement described herein offers an additional advantage related to the possibility of exploiting a non-uniform placement of the bus lines. Non uniform placement of bus lines is discussed, i.a., in L. Macchiarulo, E. Macii, and M. Poncino. "Wire Placement for Crosstalk Energy Minimization in Address Buses", IEEE Design, Automation and Test in Europe, 2002.

Figure 5:
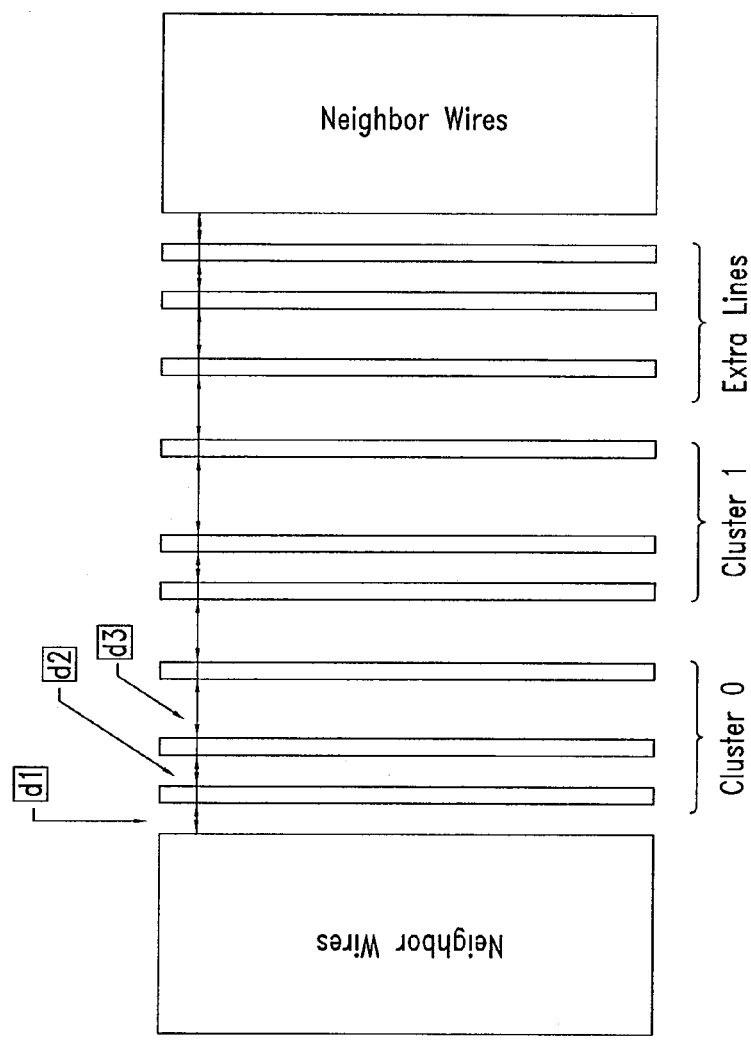
FIG. 5 is exemplary of bus line placement within the framework of the arrangement described herein.

FIG. 5 schematically depicts a generic arrangement of bus lines including a first cluster designated Cluster 0, including three lines, interposed between a set of neighboring lines/wires and another cluster designated Cluster 1. Cluster 1 is in turn interposed between Cluster 0 and a set of Extra Lines followed by other neighboring lines/wires. In FIG. 5 d1, d2 and d3 represent the non-uniform spacings between:

Cluster 0 and the neighboring wires,
the first and the second wires of Cluster 0, and
the second and the third wires of Cluster 0, respectively.

A non-uniform, asymmetric wire spacing can be exploited advantageously within the framework of the arrangement described herein. This type of strategy allows to choose in the more opportune way the values of the capacitances (and therefore the factor lambda) in order to extend the capabilities of the encoding process. This is done by resorting to dynamic permutation of the bus lines essentially by forwarding the data giving rise to high crosstalk activity toward those lines having lower capacitance values (see formula 6 above).

In terms of circuital implementation this may occur by substituting the single block (H-block) designated 208 in FIG. 3 by the parallel of the block H and another block 209 designated "crosstalk" block or C-block). Specifically, the single input of the block 208 is fed with the output of an EX-OR module node 220 which is in turn fed with B(t) and $B_{OPT}$(t−1). The same two signals are fed to the two inputs of the block 209. The sum of the outputs from the blocks 208 and 209, as provided in an adder 222, represents the individual score to be processed by the comparator block 210 of FIG. 3.

Even in the case of non-uniform wire spacing, it is thoroughly sensible to assume that the values $C_S$ are identical for all the lines/wires in the bus, while the values for $C_L$ will vary. The relationships (6) and (7) may thus be re-written as:

$$e_{TOT} = \sum_{i=1}^{N} (\alpha_L^j \cdot \lambda_i + \alpha_s^j) \tag{10}$$

$$\lambda_i = \frac{C_L^i}{C_s} \tag{11}$$

The parameters $\alpha'_s$ (alpha$_s$)—which are representative of the switching energy—are equal to 0 or 1. The parameters $\alpha'_L$(alpha$_L$)—which are representative of the crosstalk energy—is equal to 0,1, or 2 (see Table 1).

Figure 6:
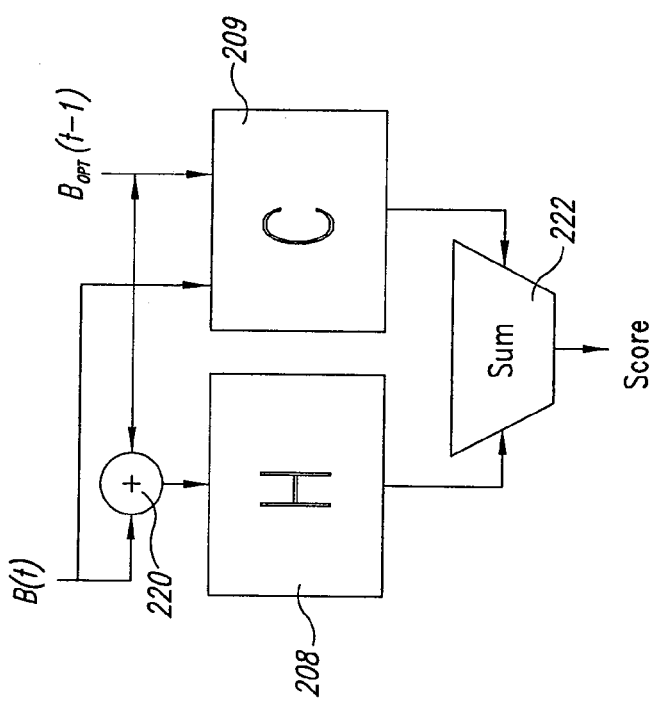
FIG. 6 is another block diagram representation of circuitry for use within the framework of the arrangement described herein.

Upon closer examination, one notes that the relationship (10) is comprised of two portions, i.e., two separate summations. The latter portion or summation (involving the parameters $\alpha'_s$ and thus representative of the switching energy) is computed by the block 208 as is the case of prior art arrangements (see, e.g., U.S. Pat. No. 6,933,863). The former portion or summation (including the parameters $\alpha'_L$ and thus representative of the crosstalk energy) is computed by the block 209 of FIG. 6.

Figure 7:
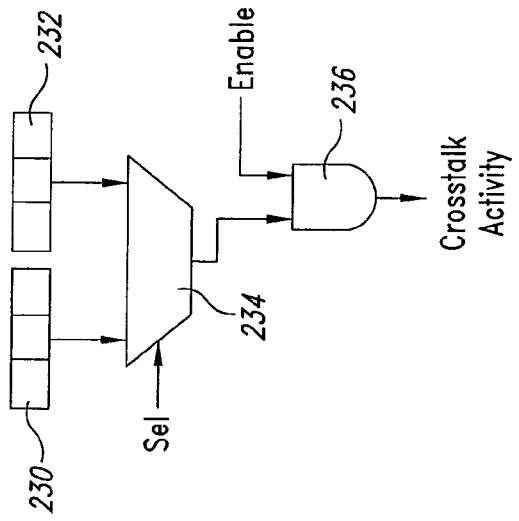
FIG. 7 details a possible implementation of one of the blocks illustrated in FIG. 6.

Typically, this takes the form of a logical network as depicted in FIG. 7. Since $\alpha'_L$ (alpha$_L$) may be equal to 0,1, or 2, one stores in two registers 230 and 232 the fixed point representations for 1 and 2, which practically means (see Table 1) storing each $\lambda_i$ both as such and as its version shifted one bit towards left.

The outputs for the two registers are then fed to a selection (Sel) gate 234 and then to an AND gate 236 operating according to the logic depicted in Table 2 that follows.

TABLE 2

| $\alpha_L^i$ | Sel | Enable |
|---|---|---|
| 0 | X | 0 |
| 1 | 1 | 1 |
| 2 | 0 | 1 |

The final sum that yields the score value (module 222 of FIG. 6) is obtained by suitably aligning the (integer) result from the H-block 208 with the (fixed point) result from the C-block 209, that is with the output from the AND gate 236. The score value thus obtained constitutes a metric corresponding to a general model of the total energy (switching plus crosstalk) dissipated by the bus both in an off-chip and in an on-chip scenario.

It will be appreciated that in the two registers 230 and 232 fixed point representations for $C_L$'s can be stored in the place of in the place of fixed point representations for $\lambda_i$'s. In that case, the H-block 208 will be modified in order to add contributions that can be either 0 or $C_s^i$. In any case, the blocks H (208) and C (209) can employ carry-save adders that are faster than standard adders and are able to add three operands at a time in the place of just two. In order to avoid making the circuitry unduly complex, the capacitances (and possibly the values for $\lambda_i$'s) can be represented with low-accuracy fixed point notation by introducing scaling factors.

Whatever the specific implementation selected, the C-block 209 thus calculates crosstalk activity values related to transmitting over the bus (i.e., over each line cluster) a respective candidate string (cluster) of data bits as linear combinations of the crosstalk capacitance values $C_L$. The coefficients of the linear combinations, i.e., $\alpha'_L$'s or $\lambda_i$'s are a function of the reordering patterns p(t). The crosstalk activity values thus calculated thus represent estimations of the energy dissipated due to crosstalk when transmitting the respective candidate strings (clusters) of data bits over the bus.

Figure 8:
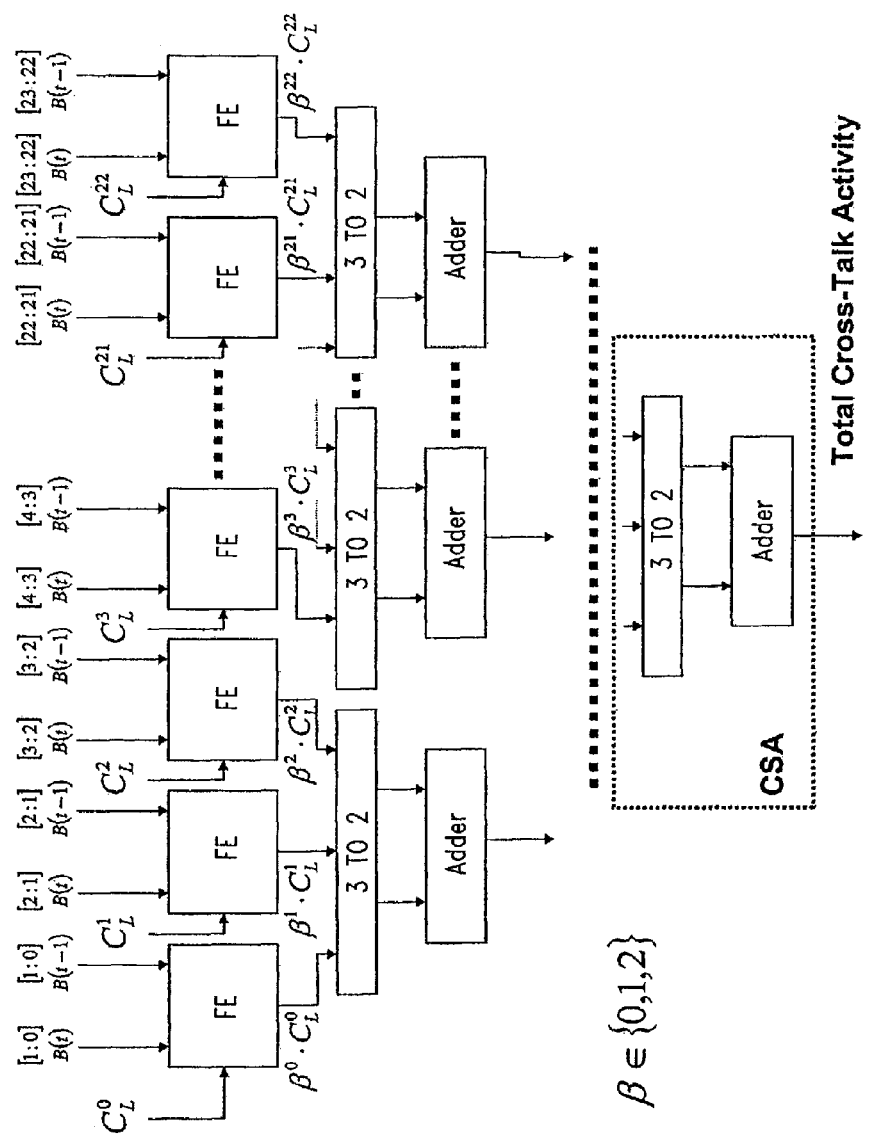
FIG. 8 is a block diagram of a carry-save adder chain for use within the framework of the arrangement described herein.

FIG. 8 illustrates a possible implementation of the C-block 209 including cascaded carry-save adders (CSA's) that receive all the crosstalk contributions in correspondence with functional elements or modules designated FE.

Figure 11:
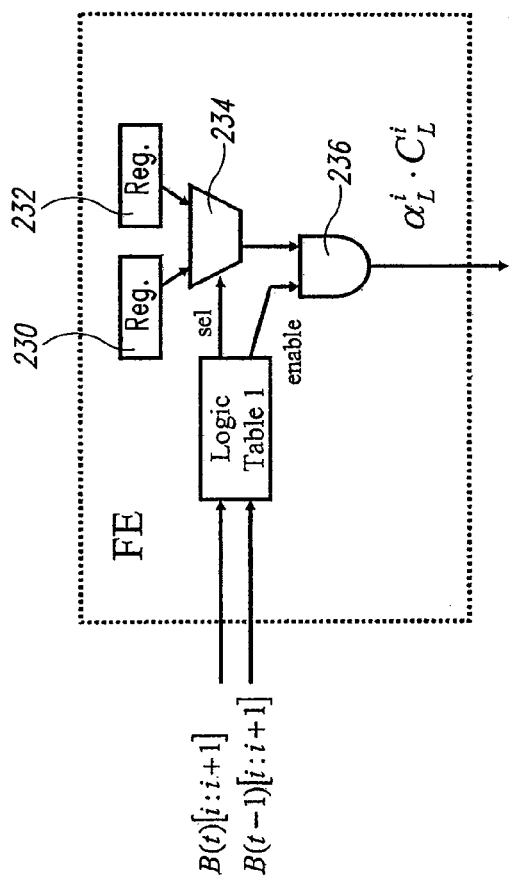
Figure 13:
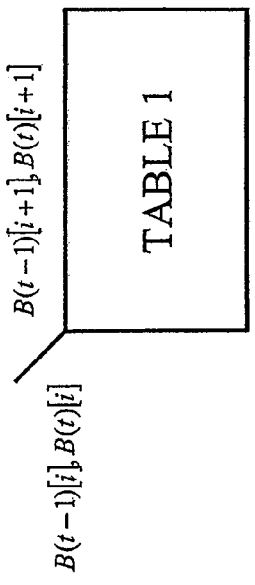

FIG. 8 depicts a three-layer hierarchical architecture wherein the uppermost layer is comprised of FE modules each having the structure shown in FIG. 11. This is essentially the same structure of FIG. 7 (the same reference numerals appearing in FIG. 7 are used to designate identical or equivalent elements in FIG. 11). With respect to FIG. 7, FIG. 11 further details the generation of the signals "sel" ed "enable" according to Table 1 starting from adjacent buses at times t and t−1 (see also FIG. 13).

Figure 12:
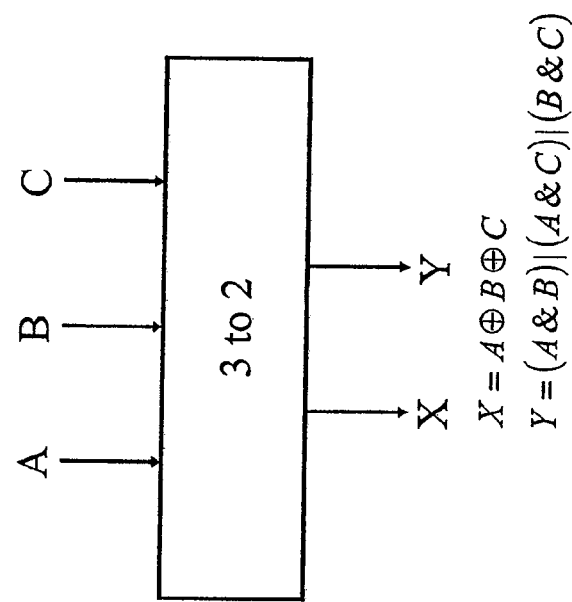

The intermediate layer of the hierarchical architecture of FIG. 8 is comprised of three-to-two (3 to 2) modules each having the structure depicted in FIG. 12, combining a fast module together with a conventional adder.

The outputs of the 3 to 2 modules are fed to adders that comprise the lowermost layer in the hierarchical architecture of FIG. 8 and provide as their outputs the desired value(s) for the total crosstalk activity The arrangement described in the foregoing widens the range of the techniques available for reducing energy consumption/dissipation in large buses. Specifically, The arrangement described in the foregoing extends the application of bus switch techniques to all those applications that aim at controlling the transmission energy associated with a data flow whose statistical distribution is not known, so that resorting to a BS technique turns out the only sensible choice.

The foregoing detailed description of a presently preferred mode of carrying out the invention is provided for purposes of illustration and is not deemed to be limiting on the broader aspects of the present invention. The broader aspects of the present invention may be implemented using a variety of different approaches that are still consistent with the scope and content of the present invention. In this regard, the foregoing description is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What we claim is:

1. A method of transmitting data over a bus including a plurality of lines, wherein energy is dissipated as a result of said transmission, the method comprising the steps of:

identifying a string of data bits to be transmitted at a time over said bus;

subjecting at least a part of said string of data bits to re-ordering according to a set of reordering patterns to produce a corresponding set of respective candidate strings of data bits to be transmitted at a time over said bus;

calculating crosstalk activity values related to transmitting over said bus said respective candidate strings of data bits;

identifying, as a function of said crosstalk activity values, an optimum string of data bits that minimizes said energy dissipated; and transmitting over said bus said optimum string of data bits.

2. The method of claim 1, including the steps of:

partitioning said lines in said bus into a plurality of line clusters;

identifying a plurality of clusters of data bits each to be transmitted at a time over a respective one line cluster out of said plurality of line clusters;

subjecting each said cluster of data bits to re-ordering according to a set of reordering patterns to produce a corresponding set of respective candidate clusters of data bits to be transmitted at a time over said respective one line cluster;

calculating crosstalk activity values related to transmitting over said respective one line cluster said respective candidate clusters of data bits;

identifying, as a function of said crosstalk activity values, an optimum cluster of data bits that minimizes said energy dissipated as a result of transmission over said respective one line cluster; and transmitting over said respective one line cluster said optimum cluster of data bits.

3. The method of claim 2, including the step of partitioning said lines in said bus into line clusters including a number of bus lines identical for each cluster.

4. The method of claim 3, including the steps of:
identifying, as a function of said crosstalk activity values, a single optimum reordering pattern that, when applied identically to all the clusters of data bits to be transmitted over all of said line clusters of said bus, minimizes said energy dissipated as a result of transmission over said bus; and transmitting, over all of said line clusters of said bus, clusters of data bits reordered using said single optimum reordering pattern.

5. The method of claim 3, including the step of partitioning said lines in said bus into line clusters each including three bus lines.

6. The method of claim 2, including the steps of:
calculating switching activity and crosstalk activity values related to transmitting over said respective one line cluster said respective candidate clusters of data bits; and identifying said optimum cluster of data bits as a cluster of data bits that jointly minimizes said switching activity and said crosstalk activity.

7. The method of claim 6, including the steps of:
identifying, as a function of said switching activity and crosstalk activity values, a single optimum reordering pattern that, when applied identically to all the clusters of data bits to be transmitted over all of said line clusters of said bus, minimizes said energy dissipated as a result of transmission over said bus; and transmitting, over all of said line clusters of said bus, clusters of data bits reordered using said single optimum reordering pattern.

8. The method of claim 1, including the steps of:
calculating switching activity and crosstalk activity values related to transmitting over said bus said respective candidate strings of data bits; and identifying said optimum string of data bits as a string of data bits that jointly minimizes said switching activity and said crosstalk activity.

9. A method of transmitting data over a bus including a plurality of lines, wherein energy is dissipated as a result of said transmission, the method comprising the steps of:
partitioning said lines in said bus into a plurality of line clusters;

identifying a plurality of clusters of data bits each to be transmitted at a time over a respective one line cluster out of said plurality of line clusters;

subjecting each said cluster of data bits to re-ordering according to a set of reordering patterns to produce a corresponding set of respective candidate clusters of data bits to be transmitted at a time over said respective one line cluster;

calculating switching activity and crosstalk activity values related to transmitting over said respective one line cluster said respective candidate clusters of data bits;

identifying an optimum cluster of data bits that jointly minimizes said switching activity and said crosstalk activity; and transmitting over said respective one line cluster said optimum cluster of data bits.

10. The method of claim 9, including the step of partitioning said lines in said bus into line clusters including a number of bus lines identical for each cluster.

11. The method of claim 10, including the steps of:
identifying, as a function of said switching activity and crosstalk activity values, a single optimum reordering pattern that, when applied identically to all the clusters of data bits to be transmitted over all of said line clusters of said bus, minimizes said energy dissipated as a result of transmission over said bus; and transmitting, over all of said line clusters of said bus, clusters of data bits reordered using said single optimum reordering pattern.

12. The method of claim 10, including the step of partitioning said lines in said bus into line clusters each including three bus lines.

13. The method of claim 10, including the step of arranging said bus lines to have non-uniform line placements, whereby said lines have different crosstalk capacitance values with respect to their neighboring lines.

14. A method of transmitting data over a bus including a plurality of bus lines including the steps of:
arranging said bus lines to have non-uniform line placement, whereby said lines have different crosstalk capacitance values with respect to their neighboring lines, said different crosstalk capacitance values ranging between lower and higher values;

identifying a string of data bits to be transmitted at a time over said bus;

subjecting at least a part of said string of data bits to re-ordering according to a set of reordering patterns to produce a corresponding set of respective candidate strings of data bits to be transmitted at a time over said bus;

calculating crosstalk activity values related to transmitting over said bus said respective candidate strings of data bits;

identifying, as a function of said crosstalk activity values, an optimum string of data bits whereby bits giving rise to high crosstalk activity are allotted to bus lines having lower crosstalk capacitance values; and transmitting over said bus said optimum string of data bits.

15. The method of claim 14, including the steps of:
calculating switching activity and crosstalk activity values related to transmitting over said bus said respective candidate strings of data bits; and identifying said optimum string of data bits as a string of data bits that jointly minimizes said switching activity and said crosstalk activity.

16. A method of estimating energy dissipated due to crosstalk between lines when transmitting data over a bus including a plurality of lines having a given line placement, whereby said lines have crosstalk capacitance values therebetween, the method comprising the steps of:
identifying a string of data bits to be transmitted at a time over said bus;

subjecting at least a part of said string of data bits to re-ordering according to a set of reordering patterns to produce a corresponding set of respective candidate strings of data bits to be transmitted at a time over said bus;

calculating crosstalk activity values related to transmitting over said bus said respective candidate strings of data bits as linear combinations of said crosstalk capacitance values, wherein coefficients of said linear combinations are a function of said reordering patterns, the crosstalk activity values thus calculated representing estimations of the energy dissipated due to crosstalk when transmitting the respective candidate strings of data bits over said bus.

17. The method of claim 16, including the steps of:

calculating switching activity and crosstalk activity values related to transmitting over said bus said respective candidate strings of data bits; and identifying said optimum string of data bits as a string of data bits that jointly minimizes said switching activity and said crosstalk activity.

18. A system for transmitting data over a bus including a plurality of lines, wherein energy is dissipated as a result of said transmission, the system operating on a string of data bits to be transmitted at a time over said bus and comprising:

a reordering pattern generator structured to subject at least a part of said string of data bits to re-ordering according to a set of reordering patterns to produce a corresponding set of respective candidate strings of data bits to be transmitted at a time over said bus;

a crosstalk activity evaluation module structured to calculate crosstalk activity values related to transmitting over said bus said respective candidate strings of data bits;

a selector unit structured to identify, as a function of said crosstalk activity values, an optimum string of data bits that minimizes said energy dissipated, and an output stage structured to transmit over said bus said optimum string of data bits.

19. The system of claim 18, wherein said lines in said bus are partitioned in a plurality of line clusters, and said string of data bits is correspondingly partitioned in a plurality of clusters of data bits each to be transmitted at a time over a respective one line cluster out of said plurality of line clusters, wherein:

said reordering pattern generator is structured to subject each said cluster of data bits to re-ordering according to a set of reordering patterns to produce a corresponding set of respective candidate clusters of data bits to be transmitted at a time over said respective one line cluster;

said crosstalk activity evaluation module is structured to calculate crosstalk activity values related to transmitting over said respective one line cluster said respective candidate clusters of data bits;

said selector unit is structured to identify, as a function of said crosstalk activity values, an optimum cluster of data bits that minimizes said energy dissipated as a result of transmission over said respective one line cluster; and said output stage is structured to transmit over said respective one line cluster said optimum cluster of data bits.

20. The system of claim 19, wherein said lines in said bus are partitioned in line clusters including a number of bus lines identical for each cluster.

21. The system of claim 20, wherein:

said selector unit is structured to identify, as a function of said crosstalk activity values, a single optimum reordering pattern that, when applied identically to all the clusters of data bits to be transmitted over all of said line clusters of said bus, minimizes said energy dissipated as a result of transmission over said bus; and said output stage is structured to transmit, over all of said line clusters of said bus, clusters of data bits reordered using said single optimum reordering pattern.

22. The system of claim 20, wherein said lines in said bus are partitioned in line clusters each including three bus lines.

23. The system of claim 19, including:

a switching activity evaluation module structured to calculate switching activity values related to transmitting over said respective one line cluster said respective candidate clusters of data bits; wherein said selector unit is structured to identify said optimum cluster of data bits as a cluster of data bits that jointly minimizes said switching activity and said crosstalk activity.

24. The system of claim 23, wherein:

said selector unit is structured to identify, as a function of said switching activity and crosstalk activity values, a single optimum reordering pattern that, when applied identically to all the clusters of data bits to be transmitted over all of said line clusters of said bus, minimizes said energy dissipated as a result of transmission over said bus; and said output stage is structured to transmit, over all of said line clusters of said bus, clusters of data bits reordered using said single optimum reordering pattern.

25. The system of claim 18, including:

a switching activity evaluation module structured to calculate switching activity values related to transmitting over said bus said respective candidate strings of data bits; wherein:

said selector unit is structured to identify said optimum string of data bits as a string of data bits that jointly minimizes said switching activity and said crosstalk activity.

26. A system for transmitting data over a bus including a plurality of lines, wherein energy is dissipated as a result of said transmission and said lines in said bus are partitioned in a plurality of line clusters, the system operating on a plurality of clusters of data bits each to be transmitted at a time over a respective one line cluster out of said plurality of line clusters and comprising:

a reordering pattern generator for subjecting each said cluster of data bits to re-ordering according to a set of reordering patterns to produce a corresponding set of respective candidate clusters of data bits to be transmitted at a time over said respective one line cluster;

a switching activity and crosstalk activity evaluation modules for calculating switching activity and crosstalk activity values related to transmitting over said respective one line cluster said respective candidate clusters of data bits;

a selector unit for identifying an optimum cluster of data bits that jointly minimizes said switching activity and said crosstalk activity; and an output stage for transmitting over said respective one line cluster said optimum cluster of data bits.

27. The system of claim 26, wherein said lines in said bus are partitioned in line clusters including a number of bus lines identical for each cluster.

28. The system of claim 27, wherein:

said selector unit identifies, as a function of said switching activity and crosstalk activity values, a single optimum reordering pattern that, when applied identically to all the clusters of data bits to be transmitted over all of said line clusters of said bus, minimizes said energy dissipated as a result of transmission over said bus; and said output stage transmits, over all of said line clusters of said bus, clusters of data bits reordered using said single optimum reordering pattern.

29. The system of claim 27, wherein said lines in said bus are partitioned in line clusters each including three bus lines.

30. The system of claim 26, wherein said bus lines have non-uniform line placements and said lines have different crosstalk capacitance values with respect to their neighboring lines.

31. A system for transmitting data over a bus including a plurality of bus lines, wherein said bus lines have non-uniform line placement and said lines have different crosstalk capacitance values with respect to their neighboring lines, said different crosstalk capacitance values ranging between lower and higher values, the system operating on a string of data bits to be transmitted at a time over said bus and comprising:
- a reordering pattern generator for subjecting at least a part of said string of data bits to re-ordering according to a set of reordering patterns to produce a corresponding set of respective candidate strings of data bits to be transmitted at a time over said bus;
- a crosstalk activity evaluation module for calculating crosstalk activity values related to transmitting over said bus said respective candidate strings of data bits;
- a selector unit for identifying, as a function of said crosstalk activity values, an optimum string of data bits whereby bits giving rise to high crosstalk activity are allotted to bus lines having lower crosstalk capacitance values, and
- an output stage for transmitting over said bus said optimum string of data bits.

32. The system of claim 31, wherein:
- said selector unit identifies, as a function of said switching activity and crosstalk activity values, a single optimum reordering pattern that, when applied identically to all the clusters of data bits to be transmitted over all of said line clusters of said bus, minimizes said energy dissipated as a result of transmission over said bus; and
- said output stage transmits, over all of said line clusters of said bus, clusters of data bits reordered using said single optimum reordering pattern.

33. A system for estimating energy dissipated due to crosstalk between lines when transmitting data over a bus including a plurality of lines having a given line placement, whereby said lines have crosstalk capacitance values therebetween, the system operating on a string of data bits to be transmitted at a time over said bus and comprising:
- a reordering pattern generator for subjecting at least a part of said string of data bits to re-ordering according to a set of reordering patterns to produce a corresponding set of respective candidate strings of data bits to be transmitted at a time over said bus; and
- a crosstalk activity evaluation module for calculating crosstalk activity values related to transmitting over said bus said respective candidate strings of data bits as linear combinations of said crosstalk capacitance values, wherein coefficients of said linear combinations are a function of said reordering patterns, the crosstalk activity values thus calculated representing estimations of the energy dissipated due to crosstalk when transmitting the respective candidate strings of data bits over said bus.

34. The system of claim 33, wherein said coefficients of said linear combinations are represented in fixed point notation in said crosstalk activity evaluation module.

35. A computer-readable medium having contents that cause a computing device to transmit data over a bus including a plurality of lines, wherein energy is dissipated as a result of said transmission, by performing a method comprising:
- identifying a string of data bits to be transmitted at a time over said bus;
- subjecting at least a part of said string of data bits to re-ordering according to a set of reordering patterns to produce a corresponding set of respective candidate strings of data bits to be transmitted at a time over said bus;
- calculating crosstalk activity values related to transmitting over said bus said respective candidate strings of data bits;
- identifying, as a function of said crosstalk activity values, an optimum string of data bits that minimizes said energy dissipated; and
- transmitting over said bus said optimum string of data bits.

36. The computer-readable medium of claim 35, wherein the method includes the steps of:
- partitioning said lines in said bus into a plurality of line clusters;
- identifying a plurality of clusters of data bits each to be transmitted at a time over a respective one line cluster out of said plurality of line clusters;
- subjecting each said cluster of data bits to re-ordering according to a set of reordering patterns to produce a corresponding set of respective candidate clusters of data bits to be transmitted at a time over said respective one line cluster;
- calculating crosstalk activity values related to transmitting over said respective one line cluster said respective candidate clusters of data bits;
- identifying, as a function of said crosstalk activity values, an optimum cluster of data bits that minimizes said energy dissipated as a result of transmission over said respective one line cluster; and
- transmitting over said respective one line cluster said optimum cluster of data bits.

* * * * *